United States Patent [19]

Bacon et al.

[11] Patent Number: 4,746,383
[45] Date of Patent: May 24, 1988

[54] CONTINUOUS FOAMED-IN-PLACE DOOR PANEL MANUFACTURING PROCESS

[75] Inventors: Howard A. Bacon, Richardson, Tex.; Roy E. Palmer, Williamsport, Pa.

[73] Assignee: Overhead Door Corporation of Texas, Dallas, Tex.

[21] Appl. No.: 39,618

[22] Filed: Apr. 17, 1987

[51] Int. Cl.⁴ .............................................. B32B 31/06
[52] U.S. Cl. .................... 156/79; 52/309.11; 156/304.3; 156/324; 264/46.5; 428/54; 428/61; 428/317.1
[58] Field of Search ............ 52/309.11; 156/79, 304.3, 156/324; 264/46.5; 428/54, 61, 317.1

[56] References Cited

U.S. PATENT DOCUMENTS

| | | | |
|---|---|---|---|
| 4,147,582 | 4/1979 | Brollo | 156/79 X |
| 4,441,301 | 4/1984 | Benson | 52/309.11 X |
| 4,453,357 | 6/1984 | Zwilgmeyer | 52/309.11 X |
| 4,536,929 | 8/1985 | Riexinger et al. | 264/46.5 X |
| 4,581,186 | 4/1986 | Larson | 264/46.5 X |
| 4,685,266 | 8/1987 | Mullet | 52/309.11 |

Primary Examiner—Robert A. Dawson
Attorney, Agent, or Firm—Kenneth R. Glaser

[57] ABSTRACT

An improved continuous automated method of manufacturing insulated door panels is provided. The process includes a step of continuously connecting discrete first skin segments end to end by means of flexible joints to form a string of first skin segments and then conveying the string to a foamable liquid injecting station. In a preferred embodiment, a polyethylene film is applied to the string in order to contain foamable liquid in event of a gap caused by separation of a flexible joint.

9 Claims, 3 Drawing Sheets

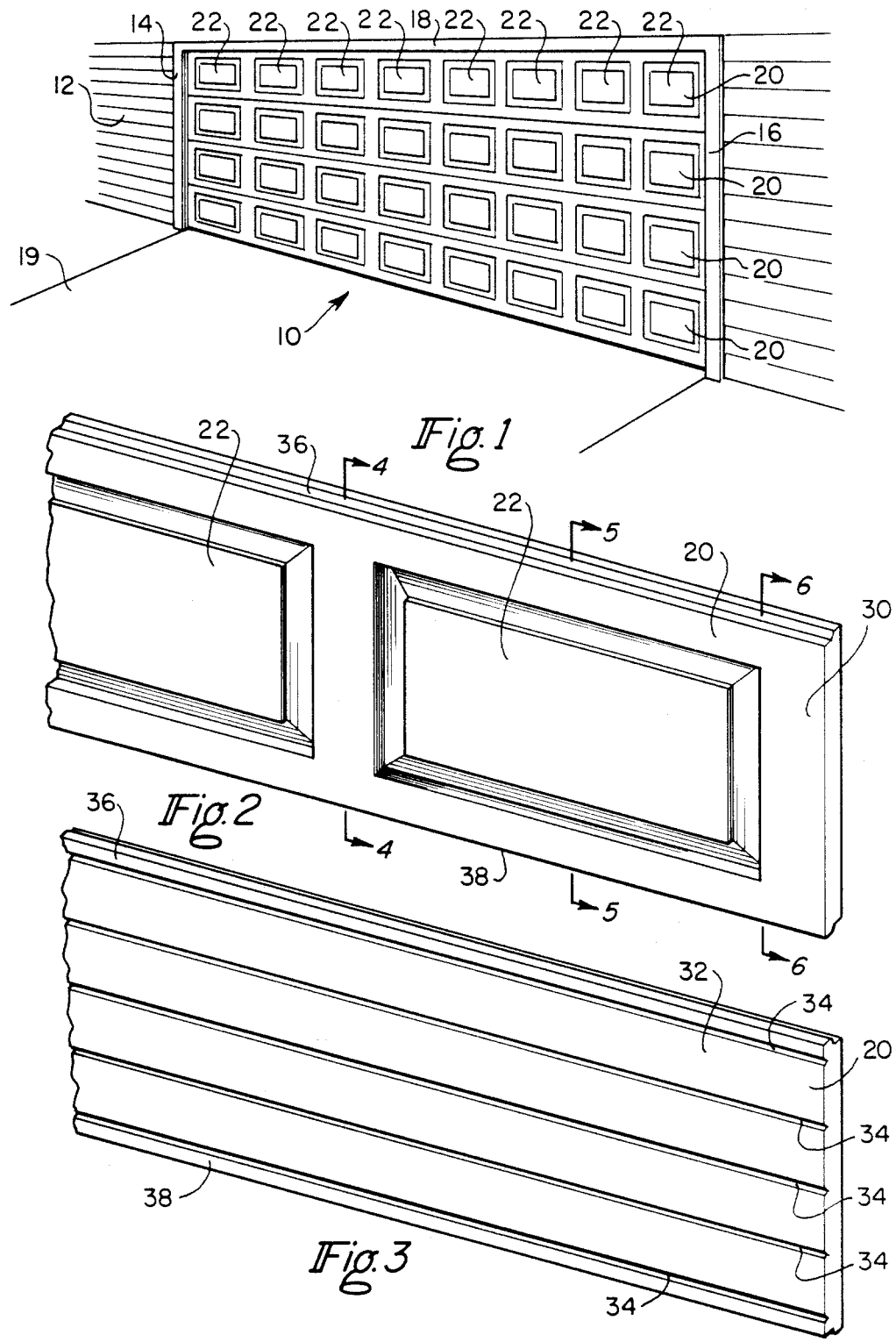

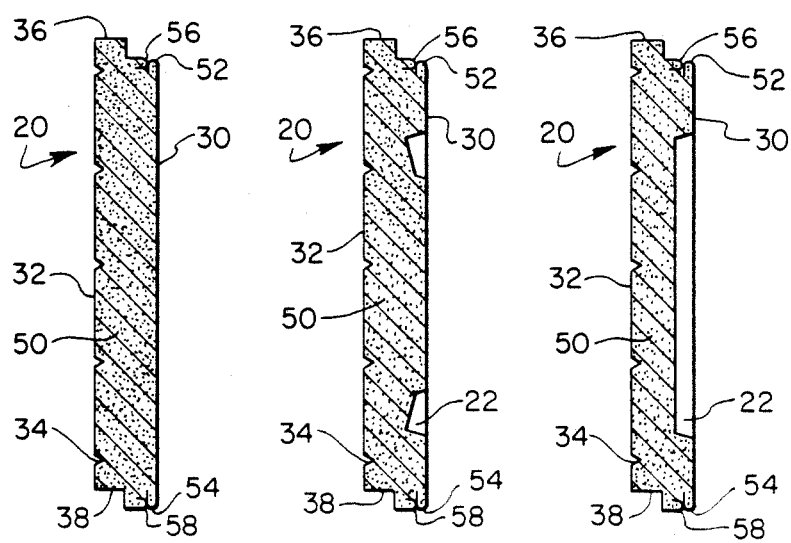
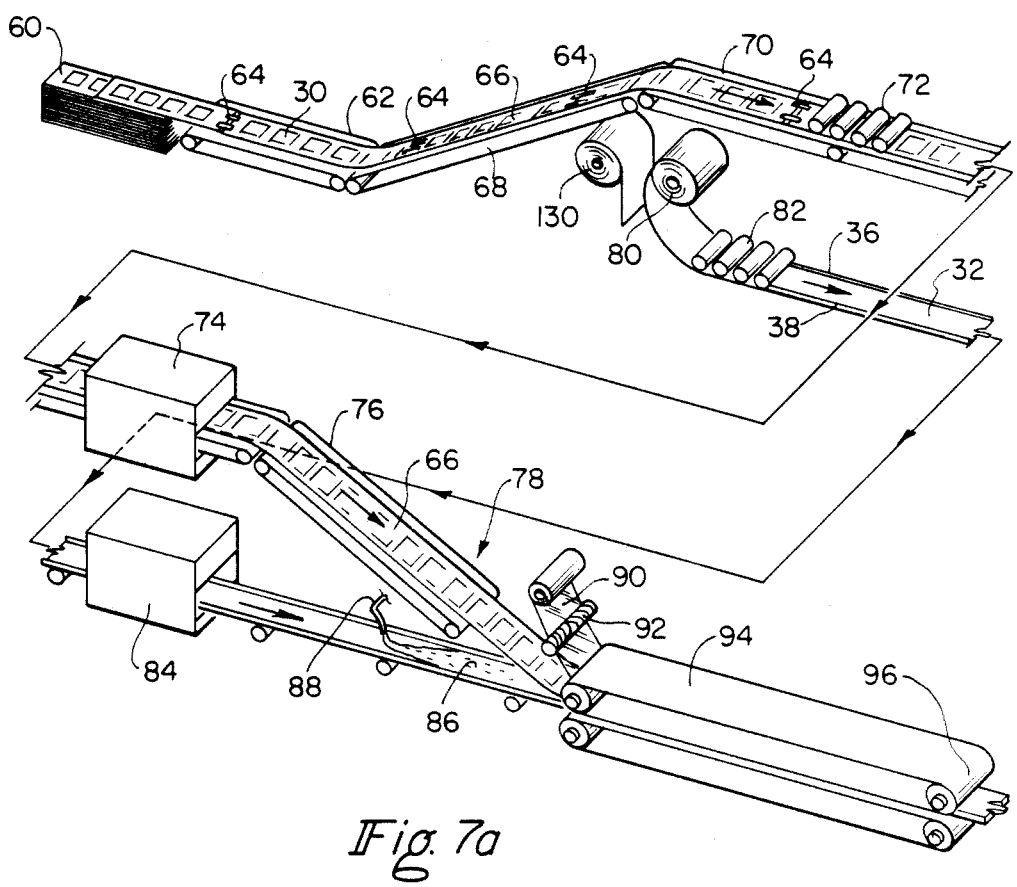

CONTINUOUS FOAMED-IN-PLACE DOOR PANEL MANUFACTURING PROCESS

TECHNICAL FIELD

This invention relates to a continuous manufacturing process for insulated garage door panels and the like where outer metal skins contain insulating foam.

BACKGROUND OF THE INVENTION

Doors of the type used for closing a large opening in a building, such as a garage door, have long been manufactured using a plurality of substantially identical panels. The plurality of panels are typically hingedly connected together to permit relative hinging movement between adjacent panels when the door is moved between a closed vertical position and an open horizontal position. Such multi-panel doors, commonly referred to as sectional doors, often employ individual wooden panels which are appropriately hingedly connected at the adjacent horizontal edges thereof. Wooden panels are costly to manufacture, however, and result in the door being extremely heavy, particularly when the door is of large size. The weight of wooden sectional doors makes opening and closing of the door extremely difficult, even when an automatic operator is used.

In an effort to improve upon wooden sectional doors, panels which are rolled or formed from a tin sheet material, such as metal, fiberglass, or plastic have been used. These rolled or formed panels are necessarily provided with some form or irregular cross-section, such as a channel shaped cross-section, to provide the panels with sufficient strength and rigidity. Doors using formed or rolled panels have proved acceptable in some situations, but suffer from the distinct disadvantages that they are extremely heat conductive leading to thermal losses when used with an air-conditioned space.

Another improved door panel construction has been used having inner and outer thin sheet material skins and an insulating core, resulting in a construction which is light in weight, thermally insulated, and highly warp-resistant over relatively long spans. This improved construction is designed to be made by a continuous and automated "foamed-in-place" process where two cells of metal or vinyl material are uncoiled in a vertically spaced relationship, edge-formed to a desired configuration, and brought together at a foam-injecting station. Liquid polyurethane foam material is then placed in the lower skin at the foam-injecting station, and the skins are held in a spaced-apart relationship by a pressure conveyor while the foam cures. At the end of the pressure conveyor, the emerging continuous strip of door panel structure is cut transversely to desired lengths.

In the prior art foamed-in-place manufacturing process, wherein the two continuous rolls of panel skin material are used, the lower skin material is typically first rolled up on the edges to form a trough longitudinal in the direction of transport of the skin material. The unexpanded, liquid foam material is then applied in the center of the trough and spread evenly across the interior surface of the trough. Meanwhile, the upper skin material is suitably edge formed and transported to an opposing relationship with the trough-shaped lower skin material holding the expanding liquid foam material. The upper skin material, lower skin material and partially expanded foam enter a pressure conveyor which constrains the skins on all sides to enable dimensional integrity while the foam cures. At the end of the pressure conveyor, the foam is fully cured, and the adhesive characteristics of the foam maintain the structural integrity of the panel. It is known to incorporate longitudinal ornamental features such as ribs into panel skins through a continuous rolling process, at or near the edge forming step of the process.

The prior art continuous foamed-in-place door panel manufacturing process uses continuous rolls of material to form the upper and lower skins. A major disadvantage of this system is that the use of continuous skin materials prohibits the incorporation of intermittent transverse ornamental features such as "raised panels" into the skins. Such features can be practically incorporated into a skin only by processes such as stamping or embossing the skin where the skin is intermittently held stationary. It has not been practical to incorporate a step into the overall foamed-in-place manufacturing process where a continuous skin material can be maintained stationary on an intermittent basis in order to emboss or stamp a transverse ornamental feature.

Another problem in adapting transverse features to the foamed-in-place process arises from difficulty in handling the skins due to their fragility in the unmanufactured state. For example, once sheet steel is embossed with an ornamental feature, longitudinal or transverse, it cannot be rolled into a continuous roll without permanently kinking the sheet.

It is also believed to be impractical to adapt the continuous foamed-in-place process, where the timing of the foam material injection and pressure containment of the skins panel during foam curing is critical, to a stamping or embossing process "on the fly". On the fly stamping or embossing would involve embossing the transverse ornamental features on the sheet as it is removed from a roll and immediately prior to entering the portion of the process where foam is sandwiched between the upper and lower skins. A stamping or embossing process using a press requires that the material intermittently be held stationary for a given cycle time during which the stamping or embossing process is performed. Rotary embossers are also believed to be impractical, as well, due to the tendency of such embossers to leave undesirable surface defects ("oil-canning") on the embossed product.

The industry has been frustrated in attempting to adapt the continuous foamed-in-place panel manufacturing process to make panels having intermittent transverse ornamental features. Thus, it can be seen that a need has arisen for a continuous foamed-in-place door panel manufacturing process that enables the use of panel surfaces that include intermittent transverse ornamental features.

SUMMARY OF THE INVENTION

An improved continuous process for manufacturing foamed-in-place door panels enables the use of door skins having intermittent transverse ornamental features. The process includes the step of continuously connecting previously embossed discrete door skin segments end-to-end by means of flexible joints to form a string of skin segments. The string of skin segments is then conveyed to a foamable liquid injecting station where foamable liquid is injected between the string of skin segments and a continuous strip of second skin material. A thin film of polyethylene is then applied to the string of skin segments. The string of skin segments, polyethylene film, foamable liquid, and second skin material are then transported through a pressure conveyor during foaming of the foamable liquid. The use of discrete skin segments connected end-to-end by flexible joints allows the incorporation of intermittent transverse ornamental features into the skin segments. The polyethylene film provides a protective barrier for containing the foamable liquid in the event of a separated flexible joint.

BRIEF DESCRIPTION OF THE DRAWINGS

A more complete understanding of the invention and its advantages will be apparent from the Detailed Description taken in conjunction with the accompanying drawings in which:

FIG. 1 is a perspective view of a garage door having door panels manufactured by the process of the present invention;

FIG. 2 is a partial perspective view of a first side of a door panel manufactured by the process of the present invention;

FIG. 3 is a partial perspective view of the second, other side of the door panel of FIG. 2;

FIG. 4 is a sectional view taken along lines 4—4 of FIG. 2;

FIG. 5 is a sectional view taken along lines 5—5 of FIG. 2;

FIG. 6 is a sectional view taken along lines 6—6 of FIG. 2;

FIGS. 7a and 7b illustrate in schematic fashion apparatus for carrying out the process of the present invention;

DETAILED DESCRIPTION OF THE PREFERRED EMBODIMENT

Figure 7B:
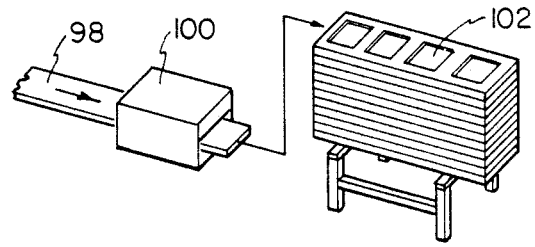

Referring initially to FIG. 1, overhead sectional door 10 encloses an opening in building 12 defined by jambs 14 and 16 and header 18. Driveway 19 forms a lower edge of the opening. Door 10 includes four door panels 20 hingedly connected to each other and mounted on conventional track and rollers (not shown) within building 12 to enable the opening of door 10 by moving it from the horizontal position shown to an ovrhead position.

Each door panel 20 includes eight intermittent transverse ornamental features 22. The features 22 shown in FIG. 1 are known as a "raised panels" and are highly desirable for aesthetic reasons for incorporation into residential buildings. Features 22 duplicate the appearance of a popular pattern commonly used in the construction of traditional wooden garage doors where individual pieces of wood are used in a cabinet-like "raised panel" construction.

Referring now to FIGS. 2 and 3, door panel 20 includes a first skin 30 in which the features 22 are formed and which is utilized as the exterior surface of the door. Second skin 32 (FIG. 3) is used as the inner surface of the door panel and includes continuous longitudinal ribs 34. Ribs 34, visible from the interior of the enclosed space, primarily serve a structural purpose in stiffening second skin 32. Upper surface 36 and lower surface 38 of door panel 20 include a rabbett joint structure which allows an overlapped, weather-tight joint between the panels. Typically, the joints between the panels also include weather stripping and a rain channel not shown in FIGS. 2 and 3. The rain channel prevents dripping when the door is opened.

Referring now to FIGS. 4, 5, and 6, first skin 30 and second skin 32 substantially enclose a foam core 50, which provides insulation between the two skins. Intermittent transverse ornamental features 22 are embossed into first skin 30, as shown in FIGS. 5 and 6. First skin 30 is overlapped at edges 52 and 54. Second skin 32 is rolled to form upper surface 36 and lower surface 38 into the rabbett joint configurations such that second skin 32 is a substantially concave, trough-like structure. In addition, the second skin 32 is overlapped to form edges 56 and 58. In the preferred embodiment, edges 52 and 56 are separated by a small gap to prevent thermal conduction between first skin 30 and second skin 32. A gap is similarly provided between edges 54 and 58.

Referring now to FIGS. 7a and 7b, the door panels are manufactured in a continuous process beginning with a stack 60 of first skin segments 30 which have been previously embossed with the desired intermittent transverse ornamental features. Discrete first door skin segments 30 are laid end-to-end on a belt conveyor 62 and connected by a flexible tape joint 64 to form a string 66 of first skin segments 60. The string 66 is elevated by way of conveyor 68 in a gradual fashion to prevent distortion of string 66. An elevated conveyor 70 receives the string 66 at the end of conveyor 68.

Joint 64 is formed using a high strength, heat-resistant, fiber-reinforced tape overlaying at least the upper sides of the ends of first skin segments 60. Tape may also be applied to the under sides of the ends for enhanced joint strength. Joints 64 enable the discrete first skin segments 60 to be self-aligning in subsequent stages of the manufacturing process, such as roll mills 72, where guiding systems rigidly control the transport of the string 66. Roll mills 72 are provided to roll the edges 52 and 54 of first skin segments 30 as shown in FIGS. 4, 5, and 6 and are located along a portion of elevated conveyor belt 70. Oven 74 is provided to control the temperature of the first skin segments 30, and then a descending conveyor belt 76 lowers the string 66 of first skin segments 30 to a foamable liquid injecting station 78.

The material for second skin 32 is provided from a continuous roll 80 beneath elevated conveyor belt 70. Material from roll 80 passes through roll mills 82 where the rabbetted surfaces 36 and 38 as well as overlapped edges 56 and 58 are formed. Surfaces 36 and 38 are upwardly turned at roll mills 82 such that second skin material 32 forms a trough. Second skin material 32 then passes through an infrared oven 84 provided to control the temperature of second skin material 32. At the foamable liquid injection station 78, foamable liquid 86 is injected from a nozzle 88 into the trough formed by second skin material 32. Nozzle 88 is located beneath the descending conveyor belt 76. A polyethylene film 90 is applied by way of a spreader roller 92 to at least the joint portions of the string 66 of first skin segments 30 immediately before the string 66, second skin material 32, and foamable liquid 86 enter pressure roller 94. For ease of application, film 90 may be continuously applied as illustrated in the figures.

The speed of transport for the process and the length of pressure roller 94 are selected such that foamable liquid 86 is substantially cured at the end 96 of pressure roller 94. The door panel structure 98 (FIG. 7b) emerging from end 96 of pressure conveyor 94 is cut to length by flying shear 100 and stored in stack 102.

Figure 9:
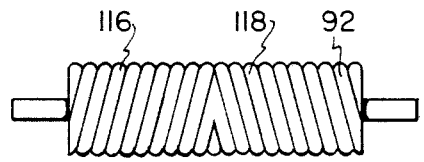
FIG. 9 is a front view of a spreader roller used in the apparatus of FIG. 8.
Figure 8:
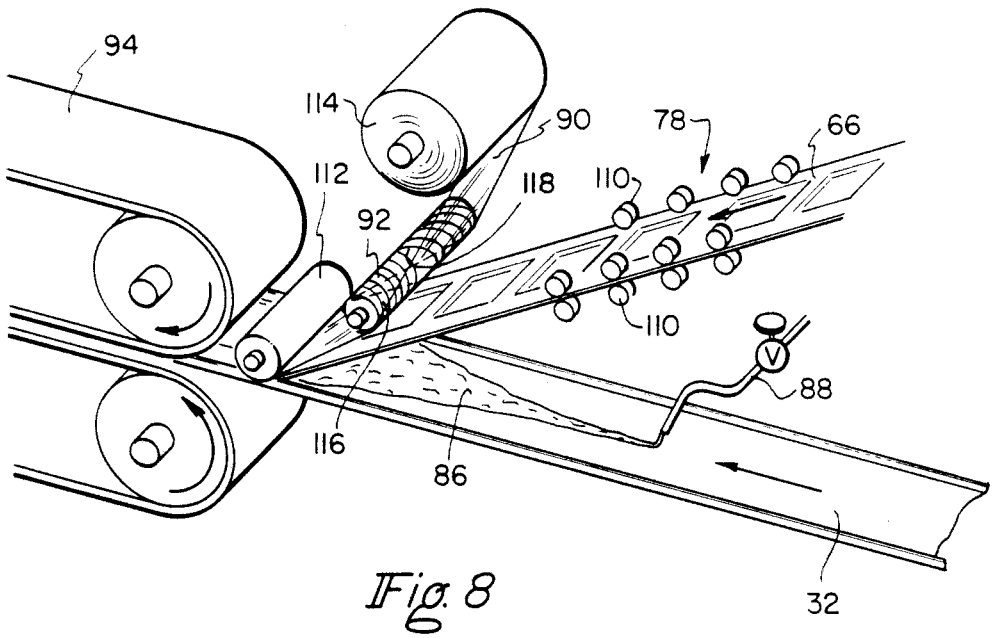
FIG. 8 is a schematic perspective view of the foamable liquid injecting station of the apparatus of FIGS. 7a and 7b.

Referring now to FIG. 8, the foamable liquid injecting station 78 is illustrated in greater detail. Guidance rollers 110 are provided to precisely aim string 66 towards in-feed roller 112. Foamable liquid 86 rapidly expands once it is applied to second skin material 32. A roll 114 of the polyethylene film 90 is fixed above spreader roller 92. In the preferred embodiment, polyethylene film 90 has an adhesive coating that enhances the application of the film 90 to the string 66 of first string segments 30. As shown in FIG. 9, spreader roller 92 has left-handed spiral grooves 116 and right-handed spiral grooves 118 to spread the polyethylene film 90 evenly before application to string 66. Pressure roller 94 is configured to constrain string 66, lower skin material 32 and foamable liquid 86 in the configuration resulting in the crosssections shown in FIGS. 4, 5, and 6.

The apparatus shown in FIGS. 7a, 7b, and 8 is also usable in connection with the prior art manufacturing process wherein a continuous upper skin material is used as opposed to the segmented string of skin segments of the present invention. When used with the prior art process, upper skin material is fed onto elevated conveyor belt 70 from a roll 130 shown in FIG. 7a. It will be appreciated that the prior art process using roll 130 can only be used when panels having only longitudinal ornamental features, or no ornamental features, are desired.

Figure 10:
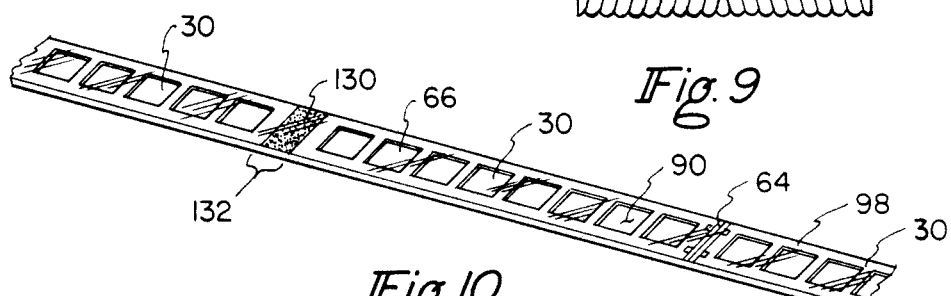
FIG. 10 is a partial perspective view of a continuous strip of door panel structure manufactured by the process of the present invention.

The function of polyethylene film 90 is illustrated in FIG. 10. The foam joints 64 are intended to maintain the connections between discrete first skin segments 30 throughout the process, however, it has been found that occasionally a flexible joint 64 will separate in the process due to stresses placed on string 66 during the roll forming steps. The ability of the flexible joints 64 to separate under high stress is desirable from the standpoint of avoiding damage the discrete first skin segments 30. It is essential, however, that some provision be made for containing the foamable liquid in the vicinity of any gaps caused by separations of flexible joints 64. Otherwise, foamable liquid and the resulting foam would contaminate pressure conveyor 94 and require a shut-down of the process in order to clean the pressure conveyor. Thus, as shown in FIG. 10, polyethylene film 90 has contained foam 130 in gap 132.

The preferred manner of providing flexible joints 64 is by use of very high strength heat-resistant adhesive tape. It will be recognized, however, that the required flexibility and self-aligning characteristics of flexible joints 64 may be obtained by other means, such as flexible mechanical links using, for example, tabs formed on one end of the first string segments and registered holes on the other ends of the segments for flexible attachment of the first string segments.

Whereas the present invention has been described with respect to a specific embodiment thereof, it will be understood that various changes and modifications will be suggested to one skilled in the art and it is intended to encompass such changes and modifications as fall within the scope of the appended claims.

We claim:

1. A continuous automated method of manufacturing insulated door panels having first and second spaced apart skins separated by a foam core, comprising the steps of:
    (a) continuously connecting discrete first longitudinal skin segments end to end by means of flexible joints to form a string of said first skin segments;
    (b) conveying said string of first skin segments to a foamable liquid injection station;
    (c) conveying a second skin material to said injecting station; (d) injecting foamable liquid at said injecting station between said string of first skin segments and said second skin material; and
    (e) maintaining said string of first skin segments and second skin material in a spaced-apart, opposed relationship during the foaming of said foamable liquid.

2. The method of claim 1 wherein said flexible joints are formed by covering end portions of said first skin segments with an adhesive tape.

3. The method of claim 2 further comprising the steps of positioning an end of each discrete first skin segment adjacent the end of the string of first skin segments and overlaying said ends with a strip of high strength, heat-resistant adhesive tape to form a flexible joint.

4. The method of claim 3 further comprising the step of transporting a stack of discrete first skin segments to the head of a conveyor for transporting the string of first skin segments.

5. The method of claim 1 further comprising the step of covering at least the flexible joints of said string of first skin segments with a thin film of material to seat intermittent gaps between first skin segments during the foaming of said foamable liquid caused by separations of said flexible joints.

6. The method of claim 5 wherein said film is formed of polyethylene and is applied to the string from a roll of material at said injection station.

7. The method of claim 1 further comprising the step of embossing said first skin segments with intermittent transverse ornamental features prior to the step of connecting the ends to form the string.

8. The method of claim 6 further comprising spreading said film prior to application by means of a roller having opposite handed spiral grooves beginning at the center of the roller and extending to opposite ends thereof.

9. The method of claim 6 where the film has an adhesive coating on the side applied to the string of first string segments.

* * * * *

UNITED STATES PATENT AND TRADEMARK OFFICE
CERTIFICATE OF CORRECTION

PATENT NO. : 4,746,383

DATED : May 24, 1988

INVENTOR(S) : Howard A. Bacon and Roy E. Palmer

It is certified that error appears in the above-identified patent and that said Letters Patent is hereby corrected as shown below:

Column 1, line 31, "form or irregular" should be -- form of irregular --.

Column 3, line 50, "ovrhead" should be -- overhead --.

Column 6, line 16, "injection" should be -- injecting --.

Column 6, line 39, "seat" should be -- seal --.

Signed and Sealed this

Sixth Day of December, 1988

Attest:

DONALD J. QUIGG

*Attesting Officer*       *Commissioner of Patents and Trademarks*